INVENTORS
AKIRA OKAYA
WILLIAM J. KEARNS

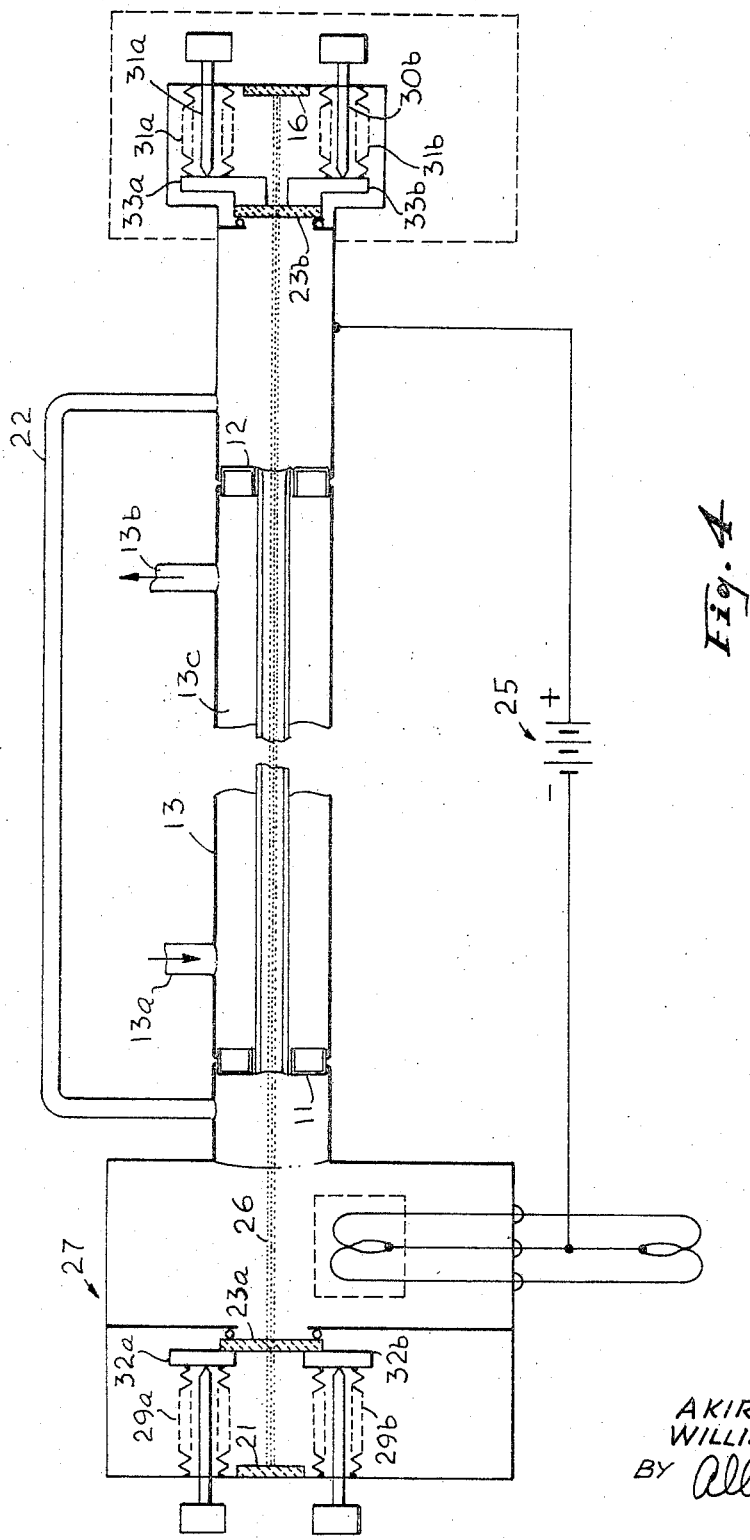

United States Patent Office 3,427,564
Patented Feb. 11, 1969

3,427,564
HIGH-POWER IONIZED GAS LASER STRUCTURE
Akira Okaya, Pasadena, and William J. Kearns, Arcadia, Calif., assignors to Electro-Optical Systems, Inc., Pasadena, Calif., a corporation of California
Filed Sept. 29, 1965, Ser. No. 491,111
U.S. Cl. 331—94.5       8 Claims
Int. Cl. H01s 3/04

The present invention relates to the laser art in general and more particularly relates to a novel metal and ceramic structure for high-power ionized gas lasers.

Heat dissipation and structural fragility have been two problem sources in the laser field, especially in connection with the high-powered ionized gas type of laser. More specifically, due to the relatively high temperatures generated during the operation of such a laser, it is essential that some effective means be provided to conduct the heat away, not only to avoid a possible deterioration of the operation itself, but also to avoid breakage and, therefore, permanent damage to and loss of this expensive equipment. However, to date, the problem has not been satisfactorily resolved.

The present invention overcomes the above-mentioned limitations, deficiencies and difficulties that are encountered among ionized gas lasers in the prior art, and it does so by providing a laser structure that is primarily constructed of metal and ceramic materials, with the metal and ceramic parts being uniquely shaped and interconnected in such a manner that the heat dissipated is efficiently carried away and wherein the stresses and strains, which oftentimes result in breakage, are kept to a minimum. More particularly, in an embodiment of the present invention, a rare gas, such as argon, xenon, krypton, helium and neon, or a mixture of them, is sealed in a tube made almost entirely of metal and ceramic materials. An anode and a cathode are mounted within and form a part of the tube envelope at opposite ends thereof, and the space between them is choked by a long capillary tube that is also made of a ceramic material. When a discharge of the gas is excited between the anode and cathode, the electron currents are forced to go through the capillary tube, thereby significantly increasing the current density. This high current density, in turn, creates a plasma wherever excitation and ionization of the gas has taken place and it does so with a high degree of efficiency. As a result of this high degree of ionization of the gas, atoms therein are excited to an upper laser state which later make the transition to a lower laser level to radiate the laser beam. As is well known, the laser oscillation is excited between the internal or external mirrors that form an optical resonator.

In accordance with the present invention, the discharge tube, in order to accommodate high-temperature plasma, is made of a ceramic material and is directly connected to metal caps at both ends. These metal caps are, in turn, respectively connected both mechanically and electrically to the cathode and anode. The outside surface of the capillary or discharge tube is placed in contact with either a circulating coolant fluid or a plurality of metal fins by means of which the heat energy is carried away from the discharge tube. Also, in accordance with the present invention, the anode is fabricated as a metal cylinder and is mounted as a part of the envelope structure, the heat dissipated at the anode being efficiently carried away either by the coolant fluid, or the fins, whichever is used.

The advantages of a laser structure according to the present invention are manyfold, some of the more important ones being as follows:

(a) The lifetime limit of an ionized gas laser which is normally affected by the high-temperature chemical reaction of the discharge tube itself, is extended many orders of magnitude through the use of a heat-resistive and high heat-conductive ceramic tube as the discharge tube;

(b) The metal and ceramic capillary discharge structure is much stronger than the relatively fragile glass and quartz parts previously employed;

(c) The direct connection of metal parts to the ends of a ceramic discharge tube of uniform inside and outside diameter keeps the stress in the ceramic tube at a minimum, thereby avoiding breakage of the ceramic tube at high-temperature operation;

(d) Since the ceramic portion of the entire structure is limited or confined only to where the high-temperature plasma is located, the ceramic discharge tube is therefore quite simple in its construction, with the result that the cost of construction is thereby very materially reduced;

(e) An anode electrode that is made of metal and that is also made a part of the gas-cell envelope makes for a simple, overall structure which, in turn, makes it possible to efficiently cool the electrode directly from the outside wall of the envelope; and (f) An air-cooled laser system that includes metal-cooling fins mounted on its ceramic discharge tube eliminates the need for more complicated cooling apparatus, which makes such a system much more portable.

It is, therefore, an object of the present invention to provide a structure that extends the useful life of high-power ionized gas lasers.

It is a further object of the present invention to provide a high-power ionized gas laser structure that can withstand high operating temperatures for long periods of time.

It is another object of the present invention to provide a high-power ionized gas laser of relatively simple construction.

It is an additional object of the present invention to provide a high-power ionized gas laser structure that facilitates the carrying away of the heat dissipated during its operation.

The novel features which are believed to be characteristic of the invention, both as to its organization and method of operation together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIGURE 4 illustrates a further modification of the FIG. 1 embodiment in which the windows are contained inside the system, thereby eliminating the need for Brewster-type windows.

Figure 1:
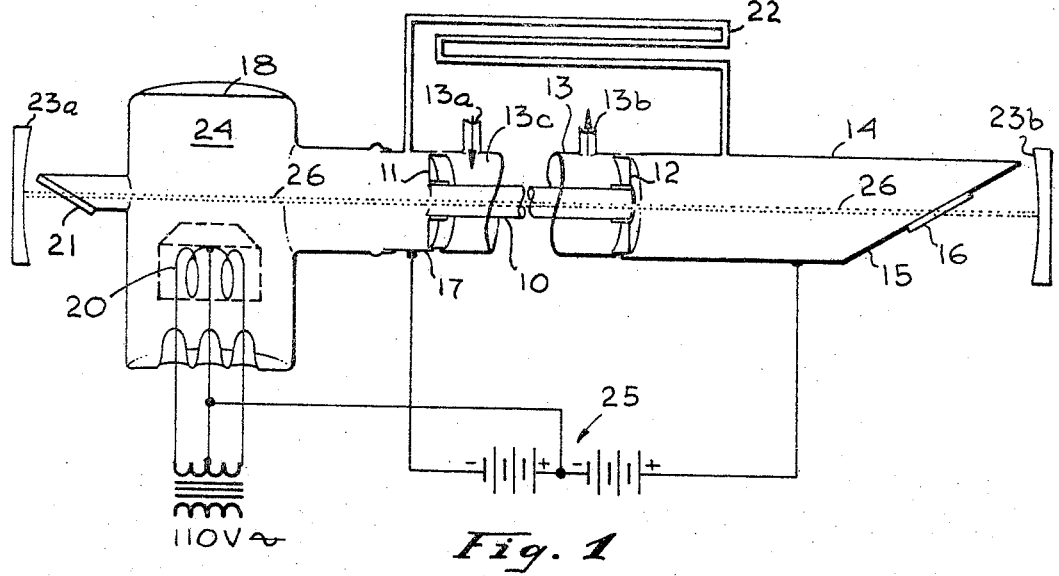
FIGURE 1 illustrates the basic construction of a first embodiment of a metal and ceramic structure for high-power ionized gas lasers in which a circulating fluid is used for coolant purposes.

For a consideration of the invention in detail, reference is now made to the drawings wherein like or similar parts or elements are given like or similar designations throughout the several figures. In FIG. 1, the embodiment therein is shown to include an elongated and cylindrically-shaped discharge tube 10 made of a highly heat-resistant material such as ceramic material, alumina ($Al_2O_3$), magnesia (MgO), beryllium oxide (BeO), boron nitride (BN), and zirconia ($ZrO_2$) being a few examples of ceramic materials that may be used herein. Discharge tube 10 is mounted on a pair of annular-shaped metal caps 11 and 12 that are respectively fitted over and hermetically sealed to the ends of the discharge tube. The caps are annular as previously mentioned, and, therefore, have central openings into which the ends of the discharge tube are respectively fitted. In the preferred arrangement, caps 10 and 11 have rims or walls along both its inner and outer edges so that they have a generally U-shaped configuration in cross-section. The ends of discharge tube 10 fit snugly into the inner cylinder of the caps, with the result that the caps are held firmly in an upright position on the discharge tube as shown in the figure. Furthermore, for reasons that will be clearer later, the ends of the discharge tube are hermetically sealed to caps 11 and 12 and any appropriate sealing material and technique may be used toward this end.

Mounted concentrially with discharge tube 10 is a cylindrically-shaped jacket 13 that has an input port 13a and an output port 13b by means of which, as will be seen below, a coolant fluid respectively enters and leaves the jacket chamber 13c therebetween. Jacket 13 rests on a projecting annulus on the aforesaid outer walls of cylinders 14 and 17 and are hermetically sealed to them as well. Thus, as is shown in the figure, discharge tube 10, jacket 13, and caps 11 and 12 together form a hollow cylindrically-shaped member in which the hollow is formed as an annular-shaped cylindrical chamber 13c through which a coolant fluid may be made to flow by means of ports 13a and 13b.

Resting on cap 12 is a metal cylinder 14 which, in the laser structure of the present invention, constitutes the anode. More specifically, cylinder 14 has the same inner diameter as the outer diameter of cap 12 and is hermetically sealed to cap 12 by welding or brazing. At the other end of the anode structure, however, the anode cylinder is cut at the desired Brewster angle and a metal plate 15, in which a Brewster window 16 is centrally mounted, hermetically encloses or seals that end of the cylinder by suitable welding or brazing techniques. Accordingly, anode 14 is, in the present invention, a hollow metal cylindrical structure that is sealed at one end by an appropriate end plate 15 in which a Brewster window 16 is suitably mounted. It should be mentioned, however, that at its other end anode 14 is only partially enclosed and that discharge tube 10 couples with or, stated differently, enters upon or opens into the chamber formed by the cylindrical envelope of the anode.

Just as an anode is mounted on one end of the discharge tube assembly, a cathode structure is mounted on the other end of this assembly and this cathode structure comprises a hollow cylindrically-shaped metal element 17 and an insulative, preferably glass, housing structure 18 which also has a generally cylindrical shape but which is enlarged at one point to provide room for the cathode, designated 20, housed therein. As may be seen from the figure, one end of housing 18 is hermetically sealed to one end of metal cylinder 17 by a glass to metal seal whose other end, in turn, is hermetically sealed to cap 11. However, element 17 is not completely sealed off or enclosed at its cap end but, rather, couples with the discharge tube which opens into the space formed by element 17. The inner diameter of element 17 is that of anode member 14 and, therefore, element 17 is merely a continuation of the structure formed by the anode and the discharge tube assembly. As previously noted, housing 18, at one end, is mechanically mounted on and sealed to element 17 and, therefore, housing 18 also communicates with discharge tube 10. The other end of the housing, however, is closed, but includes a Brewster window 21 mounted in it at the appropriate angle. As will be recognized by those skilled in the art, Brewster windows 16 and 21 lie along the axis of the described laser apparatus and, therefore, are aligned or in registration with one another.

Completing the FIG. 1 apparatus is a pressure-equalizing tube 22, a pair of mirrors 23a and 23b adapted for laser purposes, and a gas 24, preferably one of the rare gases, such as, for example, argon, xenon, krypton, helium, and neon, or a mixture of them, sealed into and filling the space formed by the above-described cathode, anode and discharge tube elements. It should be mentioned that except for the desired gas 24, which is present in the pressure range of 5 millitorr to 50 torr, the referred-to space is evacuated. However, during the operation of the laser a substantial differential in gas pressure develops across the capillary discharge tube. Therefore, the pressure-equalizing tube 22 is employed to equalize this pressure throughout the entire structure and thereby prevent excessive and possibly damaging pressures from building up at any one point. Pressure-equalizing tube 22 is preferably made of glass and as can be seen from FIG. 1, it communicates with the space on both sides of discharge tube 10, with the result that any pressure differential existing between the cathode and anode ends of the laser structure is corrected or relieved through this tube. Finally, it should briefly be stated that mirrors 23a and 23b are positioned to produce an optical resonator therebetween.

To complete the overall structure, there is also included a source of direct-current electrical power 25 whose positive and negative terminals are respectively connected to anode 14 and cathode 20. As shown in the figure, cathode 20 is likewise connected to power supply 25 at some intermediate point thereon. Hence, the metal cap is kept at a potential that can be varied from somewhat below the cathode potential to something above it.

In operation, the gas discharge from the cathode to the anode is forced to flow through the narrow channel of discharge tube 10, thereby significantly increasing its current density. This high current density, in turn, creates a high degree of ionization and excitation of the gas. As a result of this large ionization percentage of the gas, atoms are excited to an upper laser state and when they then make the transition to a lower laser level, a laser beam 26 is produced that is confined and enhanced by the optical resonator formed by mirrors 23a and 23b. The rest is well known and its description is therefore avoided. Suffice it to say that a considerable amount of heat is generated in the discharge capillary tube and to take care of it a coolant fluid, such as water, is pumped through input port 13a into jacket chamber 13c. Accordingly, the water surrounds and comes into contact with discharge tube 10, accepts heat generated therein, and then flows out through output port 13b, thereby limiting the possible rise in temperature and, in turn, significantly reducing the possibility of damage to the structure. A laser structure of the kind described in connection with FIG. 1 is mechanically and thermally stronger than the more commonly used structures with glass or quartz capillary discharge tubes.

It should be mentioned as a matter of interest that since both ends of the discharge tube are connected to metal caps, then to cathode and anode electrodes, the DC voltage across the discharge tube is also impressed upon the water jacket at the same time. However, the impedance of the water jacket is very much higher than that of the plasma discharge inside the discharge tube so that most of the current goes through the plasma discharge and only a negligibly small amount of current goes through the water. However, because the electrolysis of water due to this residual current generates hydrogen at the surfaces of the metal caps which can diffuse into the laser through the metal caps thereby contaminating the gas, the caps should be coated with a non-metallic material, such as epoxy, to prevent this electrolysis from occurring. However, other well known techniques are also available and may be used.

Figures 2, 3:
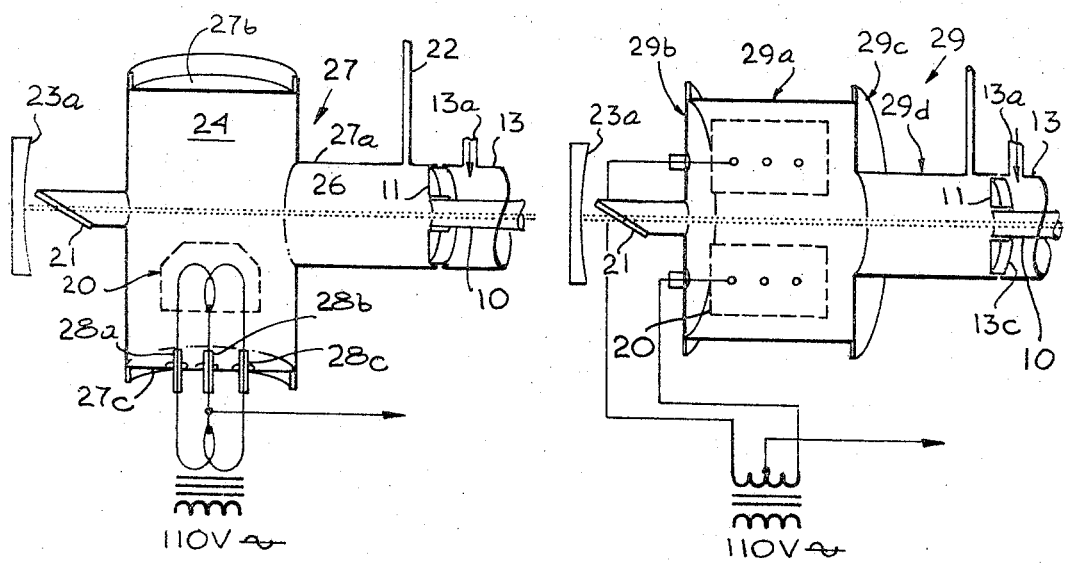
FIGURE 2 illustrates a modification of the cathode section in the FIG. 1 embodiment.
FIGURE 3 illustrates still another modification of the cathode section in the FIG. 1 embodiment which involves the use of a metal envelope.

The laser apparatus of FIG. 1 may be modified in a number of different ways as may be seen from FIGS. 2–4 and as is hereinafter described. More particularly, in FIG. 2, the cathode housing structure is shown to be modified, the modification residing in the fact that a completely metal-ceramic structure, generally designated 27, is utilized rather than the combined metal-glass-ceramic structure of FIG. 1. More specifically, metal housing structure 27 includes a generally hollow member 27a and a pair of end plates 27b and 27c mounted in the openings on either side of the hollow member to hermetically enclose the cathode member 20. Furthermore, since the cathode housing structure is now all metal, it is necessary to insulate the cathode from its housing. Accordingly, insulators, such as those designated 28a, 28b and 28c are used and by means of which passage through plate 27c can be made in a proper manner. In other respects, it will be noted that the cathode housing structure is substantially the same. The use of a cathode housing structure of the kind illustrated in FIG. 2 makes it possible to modify the cathode itself in the manner shown in FIG. 3.

Thus, as shown therein, the cathode here has been given an annular or doughnut-shaped configuration, with the opening axially through the center of the cathode allowing the laser beam to get through window 21. The envelope or housing structure in this case consists of a cylinder assembly 29 consisting of cylinder 29a and end plates 29b and 29c mounted coaxially with the cathode axis and laser beam. The cathode 20 is supported and electrically insulated by the insulators 28 mounted in the outside end plate which also contains the Brewster window assembly 21. Assembly 29 is hermetically sealed to tube 29d which, in turn, is hermetically sealed to end cap 11 as before.

By suitable modification, a ceramic and metal laser according to the present invention can also be obtained in which the mirrors are contained or mounted inside the system, thereby eliminating the need for Brewster type windows. As shown in FIG. 4, this can be achieved by placing the windows outside of the mirrors so as to keep the envelope vacuum tight. FIG. 4 shows the detail of the mirror holder and window arrangements on either side of the laser structure and, as shown therein in each arrangement the mirror 23 is critically adjusted by two micro-screws that are covered by bellows type tubes that maintain the vacuum inside. On the cathode side of the laser, the micro-screws are respectively designated 28a and 28b and the bellows tubes covering them are respectively designated 29a and 29b. On the anode side of the laser, on the other hand, the micro-screws are respectively designated 30a and 30b and the bellows tubes are respectively designated 31a and 31b. As can be seen from the figure, screws 28a and 28b are respectively screwed into members 32a and 32b which critically adjust mirror 23a under the control of the screws. On the other side of the laser, mirror 23b is critically adjusted by members 33a and 33b whose positions are likewise controlled by screws 30a and 30b.

Although a number of particular arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A high-power ionized gas laser structure comprising: a cylindrically-shaped discharge tube made of an insulative heat-resistant material; a pair of annular-shaped metal caps respectively enclosing the ends of said discharge tube; a cylindrical jacket having spaced inlet and outlet ports mounted concentrically with said discharge tube, said jacket being made of an insulative material and being supported at the ends thereof by said caps; a pair of cylindrically-shaped metal members respectively mounted on said pair of caps on either side of said jacket and in alignment therewith; laser optical means respectively enclosing said members; cathode means mounted within the laser optical means enclosing one of said members; coolant means for causing a fluid to flow through said jacket via said inlet and outlet ports; and a pressure-equalizing tube intercoupling said members.

2. A high-power ionized laser structure comprising: an evacuated cylindrically-shaped member having metal outer sections and an electrically-insulative center section therebetween; a cylindrically-shaped discharge tube mounted centrally within said member and conrentrically with the insulative center section thereof, said discharge tube being made of an electrically-insulative and heat-resistant material; a pair of metal elements mounted between and at the ends of the center section of said member and said discharge tube to enclose the space therebetween, said metal elements being adapted and mounted to respectively contact the outer metal sections of said member; tubular means made of an insulative material coupled to the outer metal sections of said member for equalizing the pressures therein; means for causing a coolant fluid to flow through the enclosed space between said center section and said discharge tube; and a pair of Brewster windows respectively mounted in the end faces of said evacuated member.

3. The laser structure defined in claim 2 wherein said structure further includes at least one of the rare gases, means for transforming said gas into a plasma column along the axis of said member and a pair of mirrors respectively mounted adjacent the ends of said member and positioned to form an optical resonator.

4. A high-power laser mechanism comprising: an evacuated structure of generally cylindrical configuration, said structure including a pair of outer chambers and a connecting tube axially disposed therebetween, at least a portion of the lateral walls of said outer chambers being made of metal and said connecting tube being made of ceramic; means mounted on said connecting tube for transferring heat away from said structure; a capillary-type tube intercoupling said outer chambers for equalizing the pressure in said structure; an optical arrangement mounted at the ends of said structure for producing an optical resonator therebetween; a pre-selected gas contained in said structure; and excitation means for converting said gas into a light-emitting plasma column.

5. The laser structure defined in claim 4 wherein said heat-transfer means includes a plurality of metal fins mounted on said ceramic connecting tube and extending outwardly therefrom.

6. The laser mechanism defined in claim 4 wherein said heat-transfer means includes a jacket mounted on and around said connecting tube, said jacket being adapted so that a coolant fluid can be passed therethrough and brought into contact with said connecting tube to limit the temperature therebeween; and fluid means for causing a fluid to flow under pressure through said jacket.

7. An ionized gas laser structure comprising: a cylindrically-shaped discharge tube made of an insulative heat-resistant material; a pair of metal caps respectively enclosing the ends of said discharge tube; a cylindrical jacket having spaced inlet and outlet ports mounted concentrically with said discharge tube, said jacket being made of an insulative material and being supported at the ends thereof by said caps; a pair of metal members respectively mounted on said pair of caps on either side of said jacket and in alignment therewith; laser optical means respectively enclosing said members; cathode means mounted within the laser optical means enclosing one of said members; coolant means for causing a fluid to flow through said jacket via said inlet and outlet ports; and a pressure-equalizing tube intercoupling said members.

8. A laser mechanism comprising: an evacuated structure of generally cylindrical configuration, said structure including a pair of outer chambers and a connecting discharge tube disposed therebetween, at least a portion of the lateral wall of said outer chambers being made of metal and said discharge tube being made of an insulator and heat-resistant material; means mounted on said discharge tube for transferring heat away from said structure; a pressure-equalizing tube intercoupling said outer chambers; an optical arrangement mounted at the ends of said structure for producing an optical resonator therebetween; a pre-selected gas contained in said structure; and excitation means mounted in said outer chambers for converting said gas into a light-emitting plasma column in said discharge tube.

References Cited

Labuda et al: "Continuous-Duty Argon Ion Laser," IEEE Journal of Quantum Electronics, vol. QE-1, pp. 273–279, September 1965.

JEWELL H. PEDERSEN, *Primary Examiner.*

E. BAUER, *Assistant Examiner.*

U.S. Cl. X.R.

313—12, 22